(12) United States Patent
Yeo

(10) Patent No.: US 8,609,269 B2
(45) Date of Patent: Dec. 17, 2013

(54) CYLINDRICAL SECONDARY BATTERY INCLUDING A CAP-UP

(75) Inventor: Chung-Ku Yeo, Yongin-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 582 days.

(21) Appl. No.: 12/805,885

(22) Filed: Aug. 23, 2010

(65) Prior Publication Data

US 2011/0104538 A1    May 5, 2011

(30) Foreign Application Priority Data

Oct. 29, 2009  (KR) .......................... 10-2009-0103564

(51) Int. Cl.
*H01M 10/02* (2006.01)
*H01M 10/04* (2006.01)
*H01M 10/42* (2006.01)

(52) U.S. Cl.
USPC ............................. 429/94; 429/163; 429/164

(58) Field of Classification Search
USPC ......... 429/163–187, 50–52, 96–100, 208, 89, 429/94, 123, 156; 221/282; 29/623.1–623.5, 246, 730–731, 29/745–746
See application file for complete search history.

(56) References Cited

U.S. PATENT DOCUMENTS

| | | |
|---|---|---|
| 2008/0182159 A1 | 7/2008 | Mitani et al. |
| 2009/0104516 A1 | 4/2009 | Yoshihara et al. |
| 2009/0148767 A1 | 6/2009 | Yamashita et al. |

FOREIGN PATENT DOCUMENTS

| | | |
|---|---|---|
| JP | 09-153355 | 6/1997 |
| JP | 10-275612 | 10/1998 |
| JP | 2001023585 A | 1/2001 |
| KR | 10-2000-0014671 | 3/2000 |
| KR | 100601521 B1 | 7/2006 |

OTHER PUBLICATIONS

Machine Translation of Iwazono et al. (JP H10-275612, Published Oct. 13, 1998, pp. 1-23).*
Machine Translation of Kim (KR 10-2000-0014671, Published Mar. 15, 2000, pp. 1-6).*
Korean Office Action issued by KIPO, dated Mar. 21, 2011, corresponding to Korean Patent Application No. 10-2009-0103564, together with Request for Entry, pp. 1-3.

* cited by examiner

*Primary Examiner* — Basia Ridley
*Assistant Examiner* — Caitlin Wilmot
(74) *Attorney, Agent, or Firm* — Robert E. Bushnell, Esq.

(57) ABSTRACT

A cylindrical secondary battery including a cap-up in which a surface region of the cap-up that is to be connected to an external device is partially coated with an insulating agent. Due to the structure of the cap-up, an unusual discharge caused due to an unusual contact of the cap-up with an external conductor, or a short between a positive electrode and a negative electrode of the secondary battery may be prevented.

10 Claims, 3 Drawing Sheets

CYLINDRICAL SECONDARY BATTERY INCLUDING A CAP-UP

CLAIM OF PRIORITY

This application makes reference to, incorporates into this specification the entire contents of, and claims all benefits accruing under 35 U.S.C. §119 from an application earlier filed in the Korean Intellectual Property Office filed on Oct. 29, 2009, and there duly assigned Serial No. 10-2009-0103564.

BACKGROUND OF THE INVENTION

1. Field of the Invention

Embodiments of the present invention relate to a cylindrical secondary battery that includes a cap-up.

2. Description of the Related Art

Secondary batteries are rechargeable batteries widely used in portable electronic devices such as mobile phones, notebook computers, camcorders, or the like. According to their shape, the secondary batteries can be classified into cylindrical batteries, rectangular batteries, and pouch-shaped batteries.

The above information disclosed in this Related Art section is only for enhancement of understanding of the background of the invention and therefore it may contain information that does not form the prior art that is already known to a person of ordinary skill in the art.

SUMMARY OF THE INVENTION

One or more embodiments of the present invention include a cylindrical secondary battery having an improved structure for preventing an unanticipated discharge or short.

Additional aspects will be set forth in part in the description which follows and, in part, will be apparent from the description, or may be learned by practice of the presented embodiments.

According to one or more embodiments of the present invention, a cylindrical secondary cell includes: an electrode assembly including a positive electrode, a negative electrode and a separator wound together; a cylindrical case accommodating the electrode assembly; and a cap assembly including a cap-up to be connected to an external device, the cap assembly being coupled with the cylindrical case to be electrically connected to the electrode assembly, wherein a surface of the cap-up is partially coated with the insulating agent.

The cap-up may include an edge unit tightly supported by the cylindrical case with a gasket disposed therebetween, and a protrusion unit protruding outwards in a center region of the cap-up surrounded by the edge unit, and an edge region of the protrusion unit may be coated with the insulating agent.

The cap-up may further include an elevated unit protruding further outwards than the edge region of the protrusion unit.

The cap-up may include an edge unit tightly supported by the cylindrical case with a gasket disposed therebetween, and a protrusion unit protruding outwards in a center region of the cap-up surrounded by the edge unit, the protrusion unit having a recessed edge region, and the recessed edge region of the protrusion unit may be coated with the insulating agent.

A surface region of the edge unit that contacts the gasket may be coated with the insulating agent.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1A:
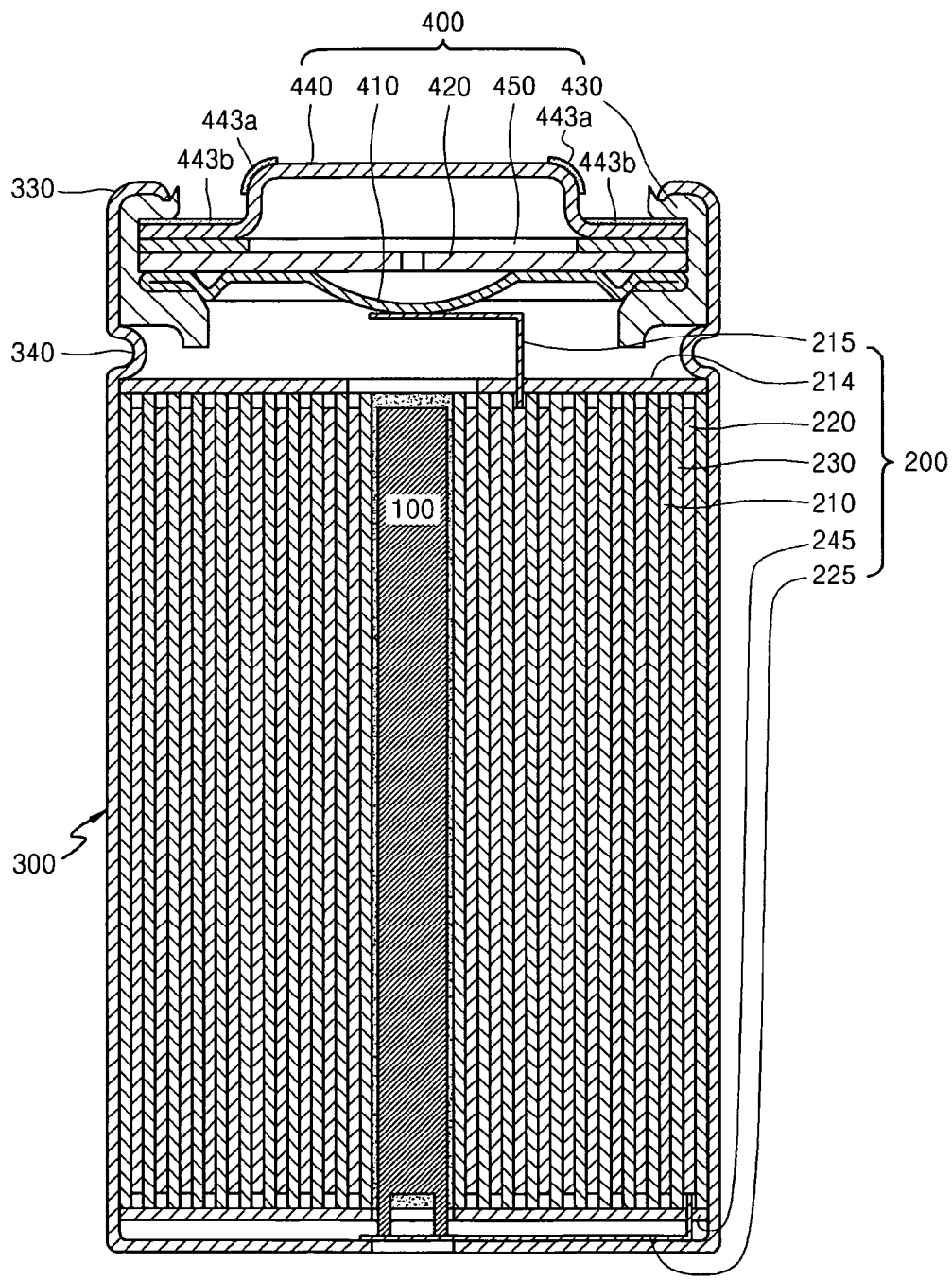
FIGS. 1A and 1B illustrate a structure of a cylindrical secondary battery according to an embodiment of the present invention.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

Recognizing that sizes and thicknesses of constituent members shown in the accompanying drawings are arbitrarily given for better understanding and ease of description, the present invention is not limited to the illustrated sizes and thicknesses.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. Alternatively, when an element is referred to as being "directly on" another element, there are no intervening elements present.

In order to clarify the present invention, elements extrinsic to the description are omitted from the details of this description, and like reference numerals refer to like elements throughout the specification.

In several exemplary embodiments, constituent elements having the same configuration are representatively described in a first exemplary embodiment by using the same reference numeral and only constituent elements other than the constituent elements described in the first exemplary embodiment will be described in other embodiments.

A conventional cylindrical secondary battery includes an electrode assembly formed by winding a positive electrode plate, a negative electrode plate, and a separator in a jelly roll shape. The electrode assembly is inserted through an opening into a cylindrical case, and the opening is sealed with a cap assembly.

In the conventional cylindrical secondary battery a cap-up, which is an exposed uppermost part of the cap assembly, directly contacts an external device to which current is supplied from the secondary battery. Thus, an unanticipated discharge may occur in the conventional cylindrical secondary battery if the cap-up contacts a conductor. As a result, lifetime of the conventional secondary battery may be shortened, and a safety problem may arise. Thus, there is a demand for a cap-up structure preventing these problems.

Figure 1B:
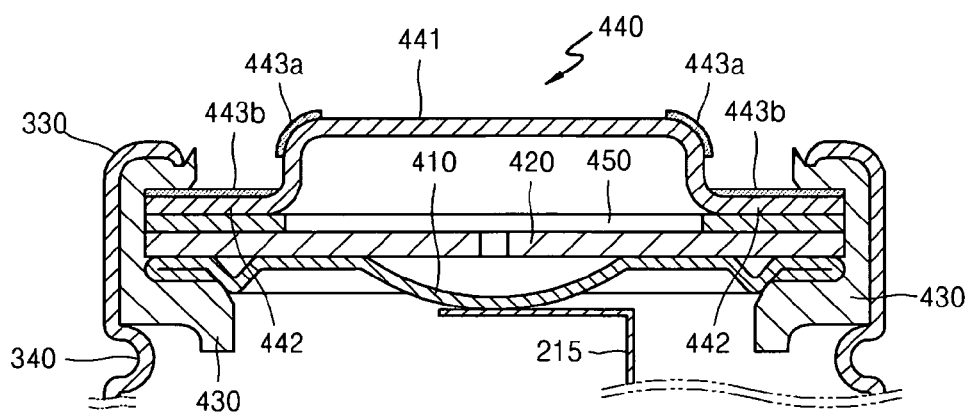

FIGS. 1A and 1B illustrate a structure of a cylindrical secondary battery according to an embodiment of the present invention. Referring to FIG. 1A, the cylindrical secondary battery according to the current embodiment of the present invention includes an electrode assembly 200, a case 300, and a cap assembly 400. The electrode assembly 200 includes a positive electrode 210, a negative electrode 220 and a separator 230 wound together in a jelly roll shape. The case 300 accommodates the electrode assembly 200. The cap assembly 400 is coupled to an opening of the case 300. The electrode assembly 200 is inserted through the opening of the case 300 into the case 300, and the opening of the case 300 is sealed with the cap assembly 400. Thus, a bare cell safely accommodating the electrode assembly 200 is obtained. Reference numeral 100 denotes a center pin inserted in a central space of the electrode assembly 200 to maintain the jelly roll structure. Reference numeral 225 denotes a negative electrode tap connected to the negative electrode 220 of the electrode assembly 200. Reference numeral 215 denotes a positive electrode tap connected to the positive electrode 210 of the electrode assembly 200. Reference numerals 214 and 245 denote insulation plates, respectively.

The cap assembly 400 has a structure including a safety vent 410, a printed circuit board (PCB) 420, a thermo device 450, and a cap-up 440 stacked upon one another in this order. The safety vent 410, which is connected to the positive electrode tap 215, has a shape invertible when the battery is overcharged. The PCB 420 is designed to have a circuit shorted when the shape of the safety vent 410 is inverted. The thermo device 450 includes a circuit shorted when the temperature rises above a predetermined temperature. The cap-up 440 is connected to an external terminal to which current is supplied. Ends of the safety vent 410, the PCB 420, the thermo device 450 and the cap-up 440 are supported by a clipping unit 330 and a beading unit 340 of the case 300 with a gasket 430 disposed therebetween.

Referring to FIG. 1B, the cap-up 440 includes an edge unit 442 tightly supported by the case 300 with the gasket 430 disposed therebetween, and a protrusion unit 441, which is an inner center part surround by the edge unit 442. The external device is supplied with current by placing it in contact with the protrusion unit 441. In this regard, a surface edge at a bending of the protrusion unit 441 is coated with an insulating agent 443*a*. The insulating agent 443*a* coated on the surface edge of the protrusion unit 441 suppresses an unanticipated discharge. In particular, mostly an unanticipated discharge occurs when an external conductor improperly contacts an edge area of the protrusion unit 441, rather when accurately contacting a center point of the protrusion unit 441. Thus, such an unanticipated discharge may be prevented by coating the surface edge of the protrusion unit 441 with the insulating agent 443*a*.

A surface region of the edge unit 442 that contacts the gasket 430 is coated with an insulating agent 443*b* in order to suppress a short between a positive electrode and a negative electrode. Though the gasket 430 is disposed between the edge unit 442 of the cap-up 440, which corresponds to the positive electrode, and the case 300, which corresponds to the negative electrode, the gasket 430 may be damaged by a strong external impact, thereby causing the positive electrode and the negative electrode to contact each other, and thus shorted. However, when the surface region of the edge unit 442 that contacts the gasket 430 is coated with the insulating agent 443*b*, such a short may be prevented even when the gasket 430 is damaged.

In other words, an unusual discharge or short may be prevented by partially coating the cap-up 440 with the insulating agents 443*a* and 443*b*.

Figure 2:
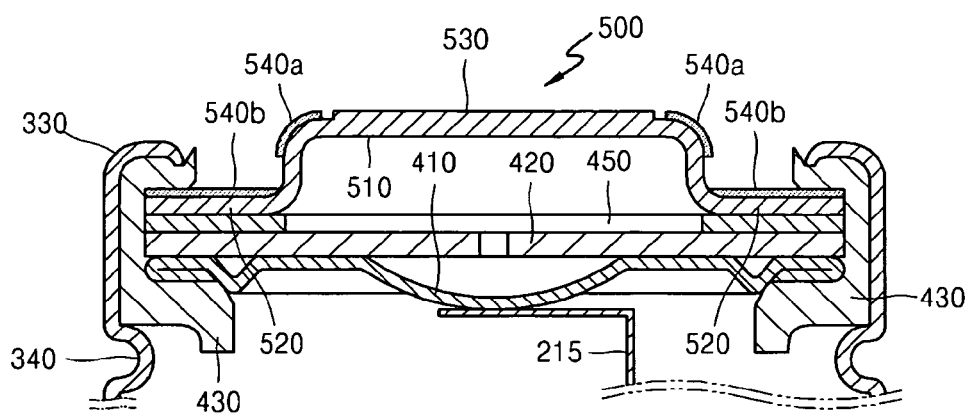
FIG. 2 illustrates a structure of a cylindrical secondary battery according to another embodiment of the present invention.

FIG. 2 is an enlarged view of a cap-up 500 of a cylindrical secondary battery according to another embodiment of the present invention. The other parts of the cylindrical secondary battery according to the current embodiment, excluding the cap-up 500, have substantially the same structures as those described in the previous embodiment.

In the current embodiment, the cap-up 500 has a structure further including an elevated unit 530 protruding outwards in a center region of a protrusion unit 510, in addition to the protrusion unit 510 and an edge unit 520. This structure facilitates the connection of the cap-up 500 to an external device to which current is to be supplied from the cylindrical secondary battery. In other words, insulating agents 540*a* and 540*b* coated on the protrusion unit 510 and the edge unit 520, respectively, still prevent an unusual discharge or short as described above. At the same time, the elevated unit 530 facilitates the connection of the cap-up 500 with the external device to which current is usually discharged from the battery. Thus, the external device is supplied with current in contact with the elevated unit 530, and an unusual discharge or short is prevented by the insulating agents 540*a* and 540*b*.

Figure 3:
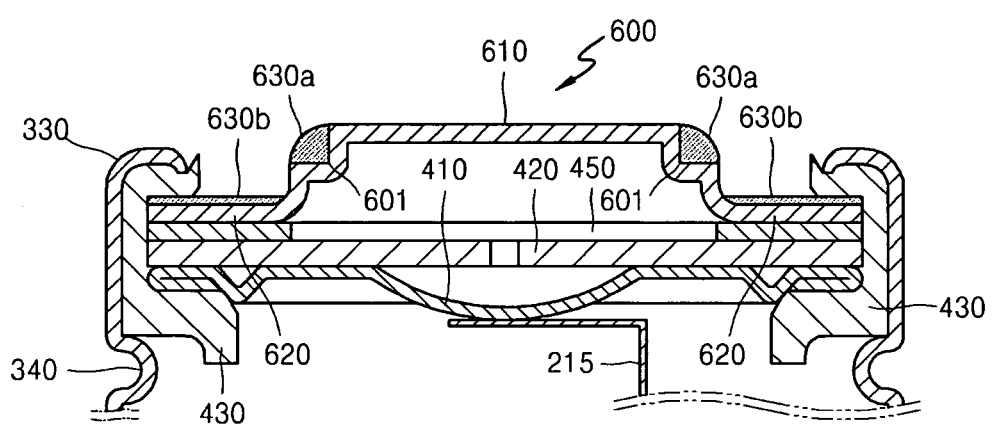
FIG. 3 illustrates a structure of a cylindrical secondary battery according to another embodiment of the present invention.

FIG. 3 is an enlarged view of a cap-up 600 of a cylindrical secondary battery according to another embodiment of the present invention. The other parts of the cylindrical secondary battery according to the current embodiment, excluding the cap-up 600, have substantially the same structures as those described in the previous embodiment with reference to FIG. 1A.

In the current embodiment, the cap-up 600 has a protrusion unit 610 and an edge unit 620. The protrusion unit 610 has a recessed edge region 601 coated with an insulating agent 630*a*. This structure of the protrusion unit 610 prevents an unusual discharge as described above, and further stably secures the insulating agent 630*a* not to protrude above the cap-up 600. The insulating agent 630*a* may likely be separated from the cap-up 600 when impacted or scratched. However, since the insulating agent 630*a* is coated on the recessed edge region 601 of the cap-up 600, the insulating agent 630*a* may be secured from such an external impact. Reference numeral 630*b* denotes an insulating agent coated on the edge unit 620 in order to prevent a short of the battery.

In the embodiments described with reference to FIGS. 1A through 3, the insulating agents 443*a* (630*a*) and 443*b* (630*b*) may be any common insulating material, such as rubber.

According to the structures of the cap-up as described above, an unusual discharge caused due to an unusual contact of the cap-up with an external conductor, or a short between the positive electrode and the negative electrode of the battery may be prevented.

As described above, according to the one or more of the embodiments of a cylindrical secondary battery, an unusual discharge caused due to an unusual contact of the cap-up with an external conductor, or a short between the positive electrode and the negative electrode of the battery may be prevented since an insulating agent is coated on the cap-up.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A cylindrical secondary cell, comprising:
   an electrode assembly including a positive electrode, a negative electrode, and a separator wound together;
   a cylindrical case accommodating the electrode assembly;
   a cap assembly including a cap-up to be connected to an external device, the cap assembly being coupled with the cylindrical case to be electrically connected to the electrode assembly, said cap-up is bent at two different and separate points of the cap-up forming an edge unit at one of the points of bending ; and an insulating agent covering a surface of the cap-up at one of the points where the cap-up is bent and on said edge unit of the cap-up, the insulating agent at the surface of the cap-up at one of the points being separated from the insulating agent on said edge unit of the cap-up, wherein the edge unit of the cap-up is tightly supported by the cylindrical case with a gasket disposed therebetween, and a protrusion unit protruding outwards in a center region of the cap-up surrounded by the edge unit, and an edge region of the protrusion unit is coated with the insulating agent.

2. The cylindrical secondary battery of claim 1, wherein a surface region of the edge unit that contacts the gasket is coated with the insulating agent.

3. The cylindrical secondary battery of claim 1, wherein the cap-up further comprises an elevated unit protruding further outwards than the edge region of the protrusion unit.

4. The cylindrical secondary battery of claim 3, wherein a surface region of the edge unit that contacts the gasket is coated with the insulating agent.

5. The cylindrical secondary battery of claim 1, wherein the cap-up comprises an edge unit tightly supported by the cylindrical case with a gasket disposed therebetween, and a protrusion unit protruding outwards in a center region of the cap-up surrounded by the edge unit, the protrusion unit having a recessed edge region, and the recessed edge region of the protrusion unit is coated with the insulating agent.

6. The cylindrical secondary battery of claim 5, wherein a surface region of the edge unit that contacts the gasket is coated with the insulating agent.

7. A cylindrical secondary cell, comprising:

an electrode assembly including a positive electrode, a negative electrode, and a separator wound together;

a cylindrical case accommodating the electrode assembly;

a cap assembly having a cap-up in which at least a portion of the cap assembly is positioned within the cylindrical case, said cap-up comprising:

an edge unit; and a protrusion unit connected to said edge unit via a first and a second bending of the cap-up;

a gasket positioned between the edge unit of the cap-up and the cylindrical case;

a first insulation agent positioned between the gasket and the edge unit from an end of the edge unit to the second bending; and a second insulation agent, separate from the first insulation agent, positioned solely on a surface of the first bending, the protrusion unit and the edge unit are in separate geometric planes.

8. The cylindrical secondary battery recited in claim 7, wherein the protrusion unit protrudes outwards in a center region of the cap-up surrounded by the edge unit.

9. The cylindrical secondary battery recited in claim 8, wherein the cap-up further comprises:

an elevated unit protruding outwards from a surface of the protrusion unit.

10. The cylindrical secondary battery of claim 7, wherein the protrusion unit protrudes outwards in a center region of the cap-up surrounded by the edge unit.

* * * * *